United States Patent [19]

Kazami et al.

[11] Patent Number: 5,274,418
[45] Date of Patent: Dec. 28, 1993

[54] IMAGE PROCESSING SYSTEM

[75] Inventors: Kazuyuki Kazami, Tokyo; Toshio Sosa, Narashino, both of Japan

[73] Assignee: Nikon Corporation, Tokyo, Japan

[21] Appl. No.: 980,442

[22] Filed: Nov. 23, 1992

Related U.S. Application Data

[63] Continuation of Ser. No. 884,236, May 11, 1992, abandoned, which is a continuation of Ser. No. 747,479, Aug. 13, 1991, abandoned, which is a continuation of Ser. No. 639,746, Jan. 14, 1991, abandoned, which is a continuation of Ser. No. 534,331, Jun. 6, 1990, abandoned, which is a continuation of Ser. No. 346,802, May 3, 1989, abandoned.

[30] Foreign Application Priority Data

May 9, 1988 [JP] Japan .................. 63-110473

[51] Int. Cl.⁵ ........................... G03B 27/52
[52] U.S. Cl. ........................ 355/40; 355/41; 355/54; 355/77; 355/21; 355/109
[58] Field of Search ............. 355/40, 41, 54, 77, 355/68, 74, 244, 53; 354/21, 67, 105, 107, 109; 346/107 R, 110 R

[56] References Cited

U.S. PATENT DOCUMENTS

| | | | |
|---|---|---|---|
| 3,490,844 | 1/1970 | Sapp, Jr. | 354/105 X |
| 3,490,844 | 1/1970 | Sapp, Jr. | 355/40 |
| 4,420,773 | 12/1983 | Toyoda et al. | 358/335 |
| 4,607,949 | 8/1986 | Hakamada et al. | 355/40 |
| 4,845,525 | 7/1989 | Ito | 355/244 X |
| 4,862,223 | 8/1989 | Yamashita | 355/54 |

Primary Examiner—D. Rutledge
Attorney, Agent, or Firm—Shapiro and Shapiro

[57] ABSTRACT

An image processing system comprises a camera in which control information is recorded, as well as image information, and a reproducing apparatus that is controlled by the control information to determine the arrangement of an array of reproduced image frames on the same reproducing medium.

39 Claims, 8 Drawing Sheets

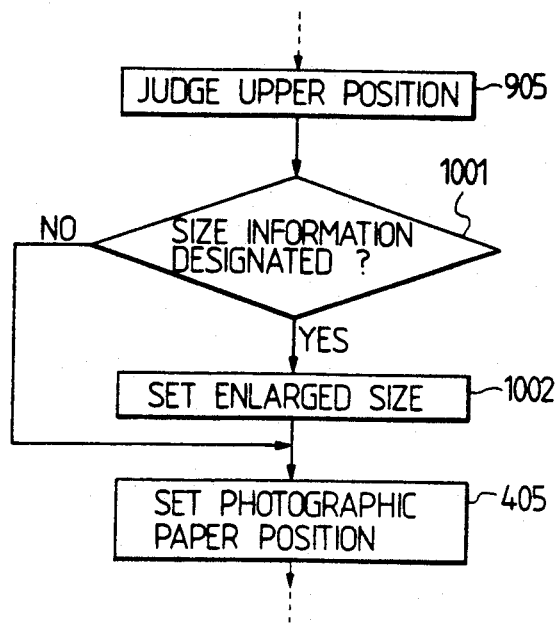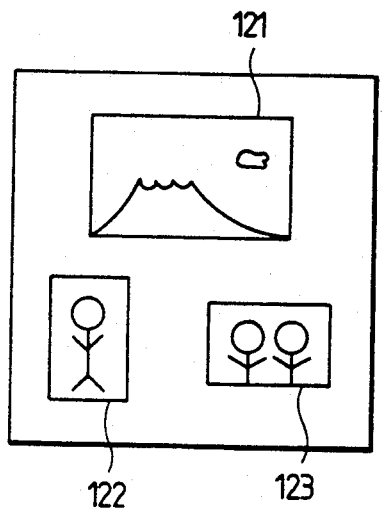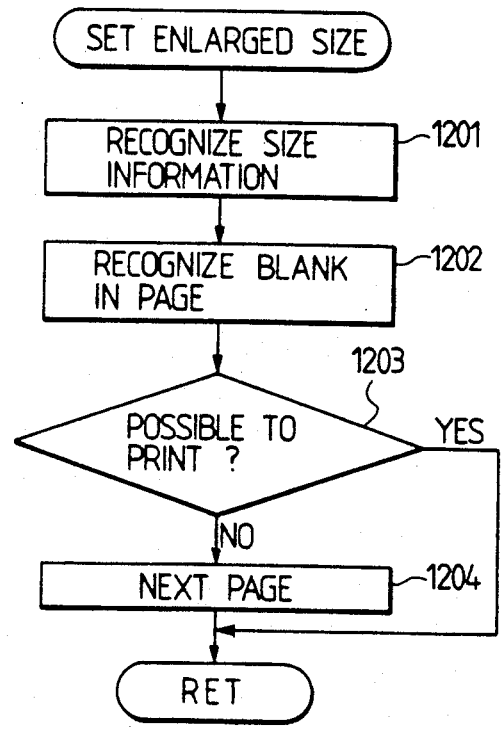

IMAGE PROCESSING SYSTEM

This is a continuation of application Ser. No. 884,236 filed May 11, 1992, which is a continuation of application Ser. No. 747,479 filed Aug. 13, 1991; which is a continuation of application Ser. No. 639,746 filed Jan. 14, 1991; which is a continuation of application Ser. No. 534,331 filed Jun. 6, 1990; which is a continuation of application Ser. No. 346,802 filed May 3, 1989, all now abandoned.

BACKGROUND OF THE INVENTION

1. Field of the Invention

The present invention relates to an image processing system in which control information recorded in a camera, as well as image information, is used to control the reproduction of the image information, more particularly to reproduce a plurality of photographs in an album-like format.

2. Related Background Art

It has previously been proposed to reproduce a plurality of photographs from film negatives on a single sheet of photographic paper in an album-like format, so that the tedious process of mounting individual photographs in an album may be alleviated. See, for example, U.S. Pat. No. 4,607,949. However, in the prior art, selection of the arrangement of different image frames to be reproduced is performed as an initial phase of the reproducing process and may require a considerable amount of work.

SUMMARY OF THE INVENTION

The present invention provides a system in which control information for controlling the reproduction of a plurality of image frames in an array is recorded in a camera, as well as image information. The control information automatically controls reproducing apparatus to determine the arrangement of a plurality of image frames on the same reproducing medium, e.g., a sheet of photographic paper. The control information may determine the number, orientation, and size of the image frames reproduced on the same medium and may determine which of a plurality of image frames are grouped together in the reproducing process.

BRIEF DESCRIPTION OF THE DRAWINGS

FIG. 10 is a flow chart illustrating a portion of a process in accordance with the invention, using information as to the size of an image to be reproduced;

FIG. 11 is a schematic illustration of a print obtained utilizing the size information;

FIG. 12 is a flow chart illustrating another portion of a process of the invention, utilizing size information;

DETAILED DESCRIPTION OF THE PREFERRED EMBODIMENTS

Figure 1:
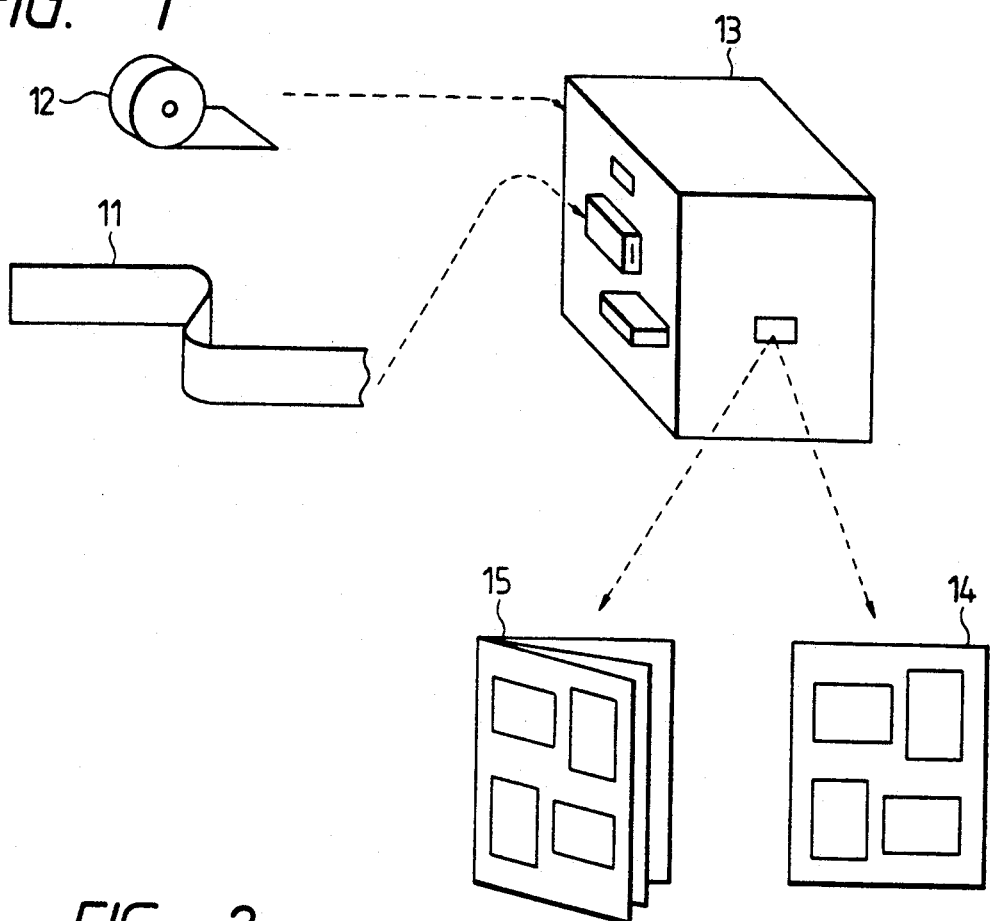
FIG. 1 is a schematic diagram showing, broadly, a printing (reproducing) system that may be employed in the image processing system of the invention.

FIG. 1 shows a schematic diagram of a printing (reproducing) system that may be employed in the present invention. A developed negative film 11 and a roll-shaped photographic paper 12 are supplied to a printer 13. In the printer 13, in accordance with a processing procedure, which will be explained herein later, a cut sheet album-like print 14 or an album print 15 of the type in which a plurality of photographic papers are bound is output.

Figure 2:
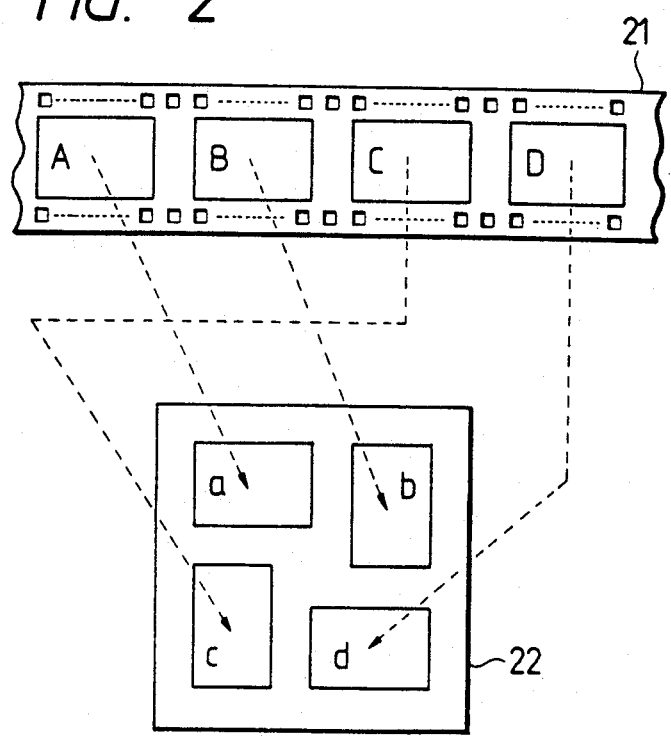
FIG. 2 is a schematic diagram showing the relationship of film negatives and photographs reproduced on the same medium in the system of FIG. 1.

FIG. 2 shows the relation between the negative film 11 and the print 14 in FIG. 1. That is, the picture planes of four frames on a negative film 21 are arranged on one photographic paper 22. In this example, four frames A, B, C, and D of the negative film 21 are shown so as to correspond to a, b, c, and d on the photographic paper 22, respectively.

Figure 3:
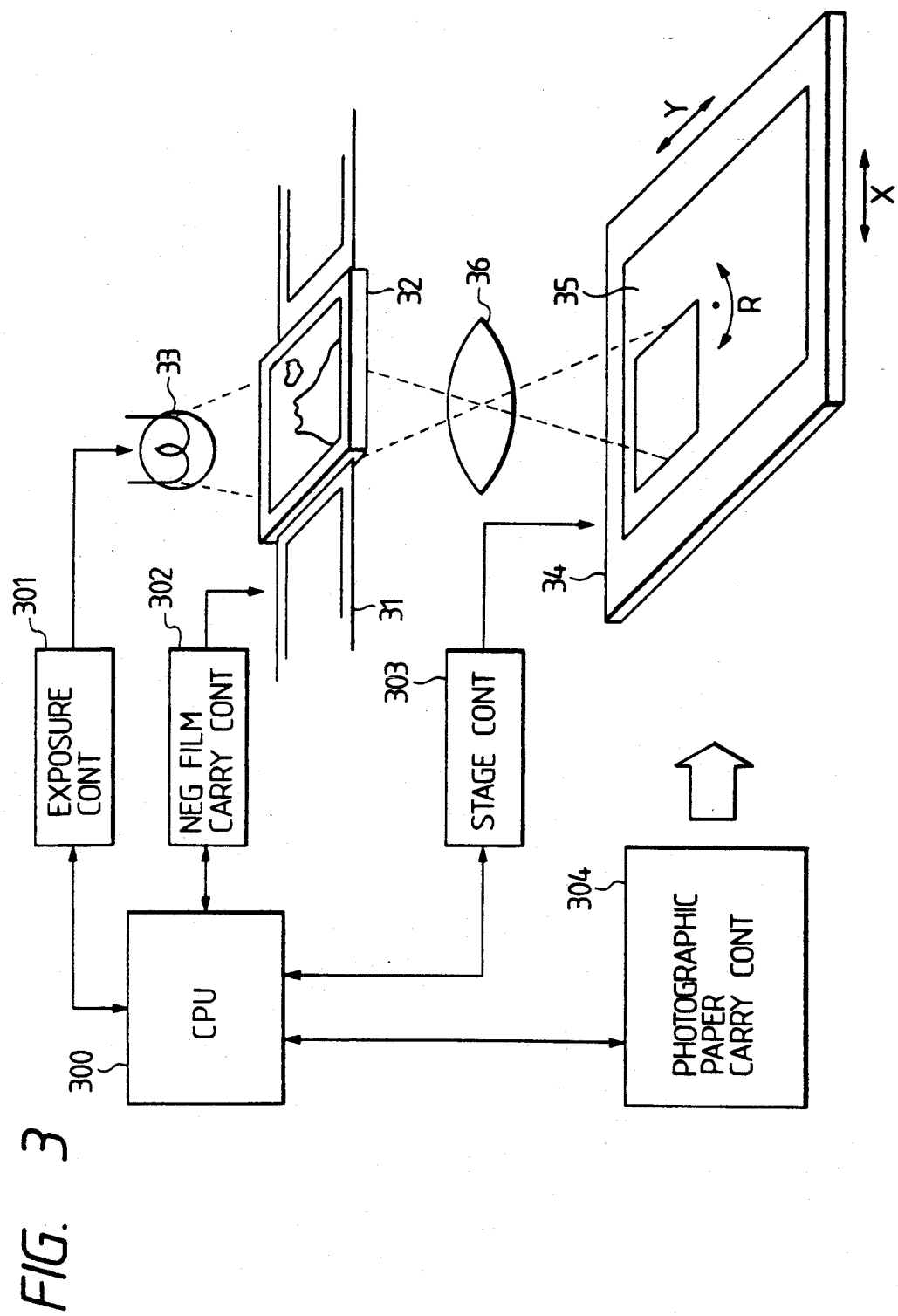
FIG. 3 is a schematic block diagram showing the printing system of FIG. 1 in greater detail.

FIG. 3 shows the printing system in greater detail.

A negative film 31 after development, is led to a carrier 32 in the printer. A frame to be printed is arranged between a light source 33 and a projecting optical system 36 in the carrier 32.

A stage 34, on which a photographic paper 35 cut to the size of one page is placed, is driven by stage control means, 303 which will be explained herein later, in orthogonal directions (X and Y directions shown in the diagram) and in a rotating direction (R direction shown in the diagram).

A central process unit (CPU) 300 controls an exposure control circuit 301, a negative film carry control circuit 302, a stage control circuit 303, and a photographic paper carry control circuit 304.

The exposure control circuit 301 controls the light on/off of the light source 33.

The negative film carry control circuit 302 carries the negative film 31 frame-by-frame, to the carrier 32 and also changes to the next negative film after completion of the carrying operation of all frames.

The stage control circuit 303 drives the stage 34 in the orthogonal and rotating directions.

The photographic paper carry control circuit 304 carries the photographic papers 35 one by one to the stage 34 and changes to the next photographic paper after completion of the printing operation to one photographic paper 35 (exposure by the light source 33). The photographic paper carry control circuit 304 also has cutting means for cutting the unused photographic paper supplied in a roll or large sheet shape into the size of one page of the album-like print. The printing operation is executed in the state of the roll- or large sheet-shaped photographic paper and, thereafter, the printed photographic paper can be cut out by cutting means.

The operation of the printing system of FIG. 3 will now be described in accordance with a flow chart of FIG. 4. The flow chart is stored as a program in the CPU 300.

In step 401, the CPU 300 drives the negative film carry control circuit 302, thereby setting the negative film 31 after development, to the carrier 32. Then, the processing routine advances to step 402.

In step 402, the CPU 300 drives the photographic paper carry control circuit 304, thereby supplying a roll-shaped photographic paper to the cutting means provided in the photographic paper carry control circuit 304.

In the next step 403, the CPU 300 drives the photographic paper carry control circuit 304 and allows the roll-shaped photographic paper to be cut to the size of one page of the album-like print by the cutting means and allows the cut photographic paper 35 to be carried onto the movable stage 34.

In step 404, the CPU 300 drives the negative film carry control circuit 302, thereby positioning the first frame to be printed in the negative film 31 to a position between the light source 33 and the projecting optical system 36.

In step 405, the CPU 300 drives the stage control circuit 303 and allows the movable stage 34 to be driven in the orthogonal and rotating directions in a manner such that the area to be first printed on the photographic paper 35 faces the projecting optical system 36. Then, step 406 follows.

In step 406, the CPU 300 drives the exposure control circuit 301 and allows the light source 33 to be lit for a proper time. The picture plane of the first frame to be printed on the negative film 31 is projected and exposed in the area to be first printed on the photographic paper 35 by the projecting optical system 36.

In the next step 407, the CPU 300 checks to see if the exposure of one page of the photographic paper has been completely finished or not. If NO, the processes in step 404 to 407 are repeated. If YES, step 408 follows.

In step 408, the CPU 300 checks to see if the exposure of all frames on the negative film to the photographic paper has been finished or not. If NO, the processing routine is returned to step 403 and the page feeding operation to set a new photographic paper onto the stage 34 is executed. The processes in steps 403 to 408 are repeated. When all of the frames on the negative film 31 have been printed to a plurality of album-like photographic papers 35, the answer in step 408 becomes YES and the printing process of the negative film 31 is completed.

In the explanation of step 405, it was stated that the stage 34 is driven in the orthogonal and rotating directions such that the area to be printed on the photographic paper 35 faces the projecting optical system 36. However, the invention is not limited to such a construction. For instance, the negative film 31 can be moved in each of the directions. Or, an image rotator may be provided for the projecting optical system 36, and by driving the image rotator, the exposure picture plane may be also rotated for the photographic paper 35.

An embodiment of the invention will now be described with reference to FIGS. 5 and 6.

Figure 5:
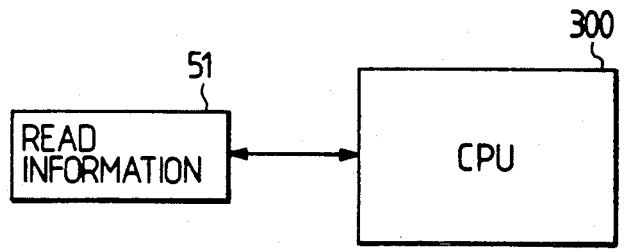
FIG. 5 is a simplified block diagram illustrating a portion of the image processing system of the invention.

In FIG. 5, an information reading circuit 51 is connected to the CPU 300 which is part of the system of FIG. 3. The information reading circuit 51 reads information which was directly optically recorded onto the film by a well-known data superposing apparatus or information recorded onto a storage medium (a magnetic storage medium such as magnetic tape or the like, a semiconductor storage medium such as an E²PROM or the like, etc.) provided for the film container. The content of such information includes, for instance. An indication of which direction of the picture plane of the frame photographed is set to the upper direction or lower direction (hereinafter, such information is referred to as upper/lower information).

Figure 6:
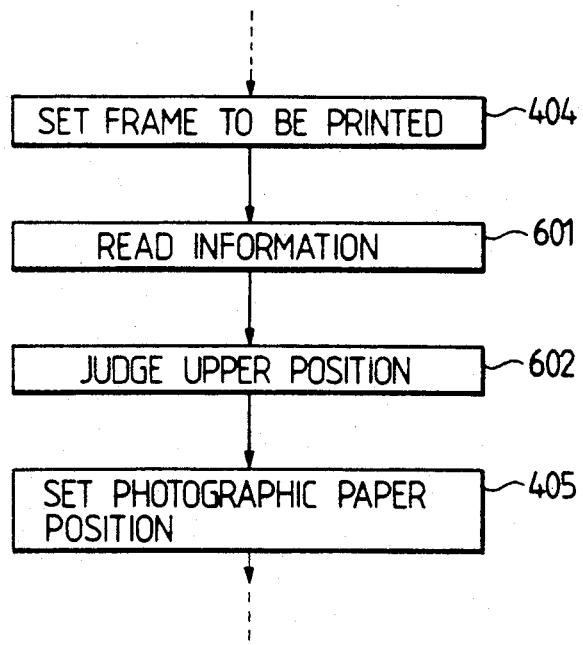
FIG. 6 is a flow chart illustrating the operation of the system of FIG. 5.

FIG. 6 shows a partial flow diagram in the case of controlling the printer by using the upper/lower information. FIG. 6 differs from FIG. 4 only in that the processes in steps 601 and 602 are inserted between steps 404 and 405 in FIG. 4.

Figure 4:
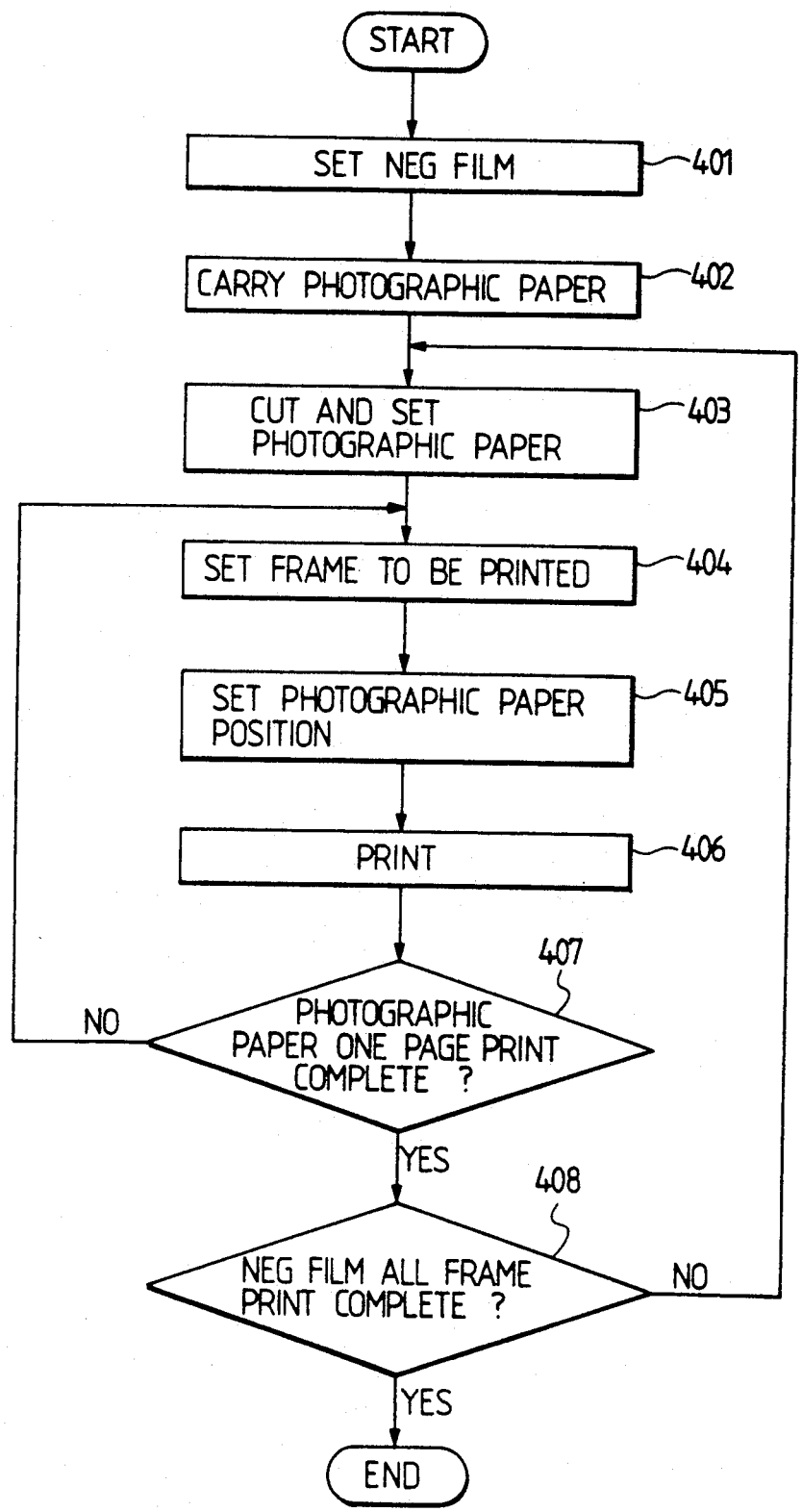
FIG. 4 is a flow chart illustrating the operation of the printing system of FIG. 3.

After completion of the processes in steps 401 to 404 in FIG. 4, the upper/lower information corresponding to the frame on the negative film 31 to be printed next is read out of the storage medium by the information reading circuit 51 in step 601.

In the next step 602, a rotating angle of the photographic paper 35 is obtained on the basis of the upper/lower information.

In the next step 405, the stage 34 is controlled also in consideration of the rotating angle information.

The processes after step 406 are then successively executed.

By the processes in steps 601 and 602, the upper and lower directions of the picture planes of the respective frames which are arranged on the photographic paper 35 are aligned.

Figure 7:
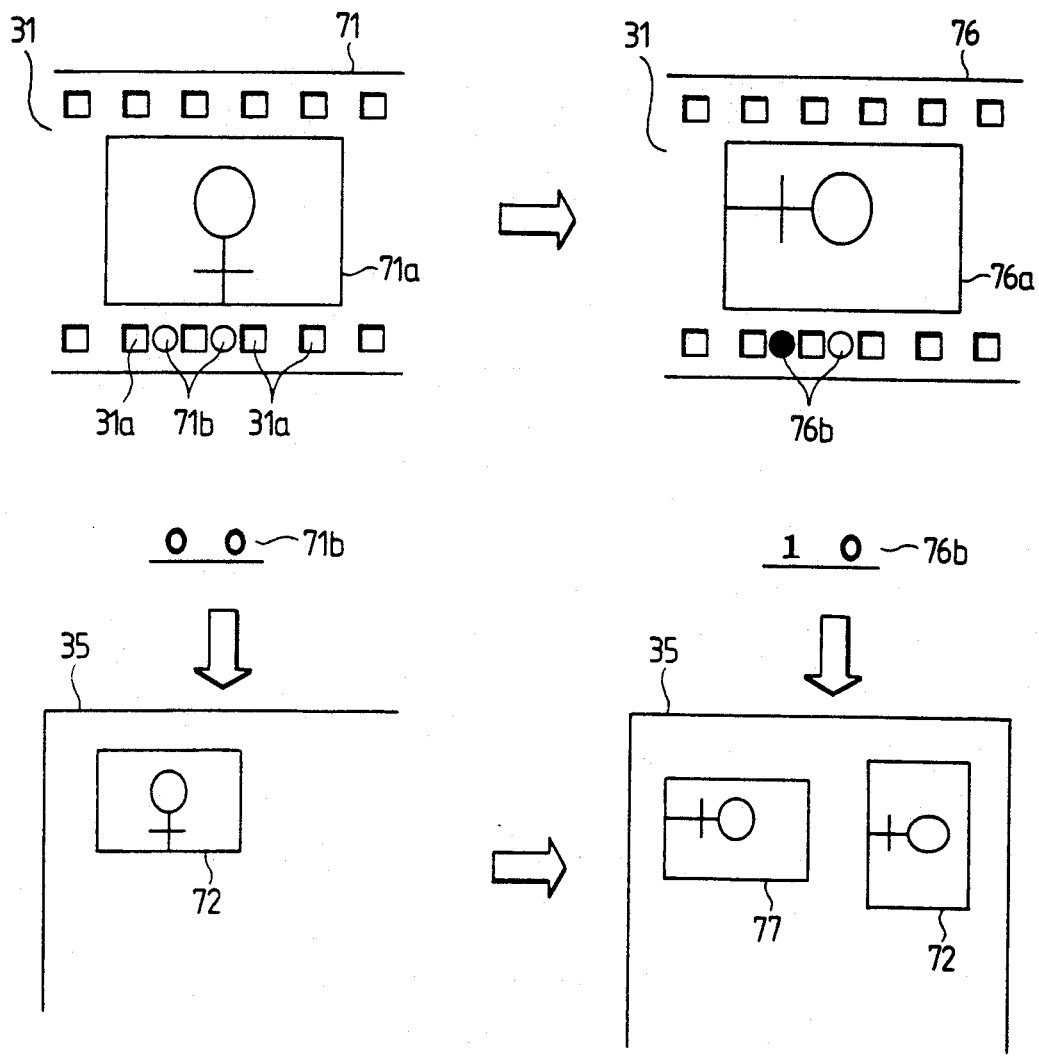
FIG. 7 is a schematic illustration showing the relationship of film negatives, on which control information is recorded, and photographs reproduced in accordance with a system of the invention.

FIG. 7 shows the relationship between frames of a negative film, including control information, and print reproductions of the frames. In the illustration, a photographed image 71a and upper/lower information 71b produced by data superposing apparatus are recorded in one frame 71 on the negative film 31.

The upper/lower information is constituted by a mark which is superposed or recorded by a light source such as a lamp or the like into two areas among three perforations 31a of the film 31. A white circle "o" indicates the case where nothing is actually superposed and it corresponds to a digital value "0". A black circle "●" represents the case where information was superposed and it corresponds to a digital value "1".

The upper/lower information 71b is two-bit information of value "0, 0" and is recorded in the case where the photographing operation was executed with the upper side of the camera set to the upper direction, that is, in the case where one of the two long sides defining the picture plane is at the upper position and the other is at the lower position (ground). In this case, the photographed image 71b is printed as a picture plane 72 on the photographic paper 35.

A photographed image 76a and upper/lower information 76b produced by the data superposing apparatus are recorded in the next frame 76 on the negative film 31.

The upper/lower information 76b is two-bit information of value "1, 0" and is recorded in the case where the photographing operation was executed with the right side of the camera set to the upper direction, that is, in the case where one of the two short sides defining the picture plane is at the upper position and the other is at the lower position (ground). In this case, the stage 34 is rotated such that the upper/lower positions of a print picture plane 77 of the photographed image 76a coincide with the upper/lower positions of the print picture plane 72 of the previous frame.

The bits "0, 1" are recorded in the case where the photographing operation was performed with the lower side of the camera set to the upper direction, that is, in the case where one of the two long sides defining the picture plane is at the lower position (ground) and the other is at the upper position. The bits "1, 1" are recorded in the case where the photographing operation was performed with the left side of the camera set to the upper direction, that is, in the case where one of the two short sides defining the picture plane is at the lower position (ground) and the other is at the upper position.

Figure 8:
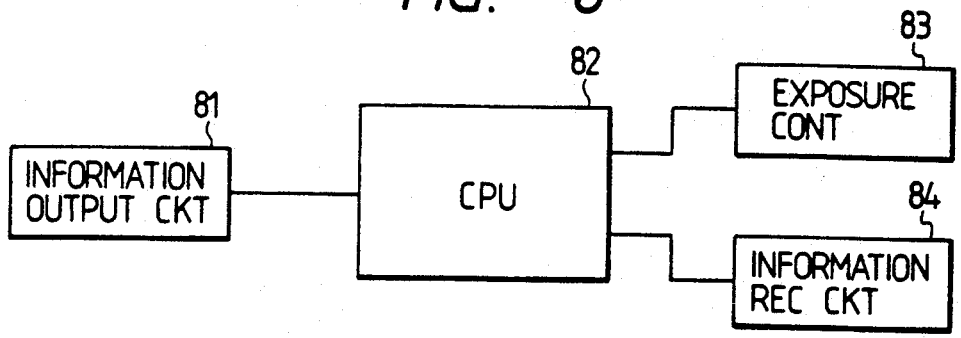
FIG. 8 is a block diagram of a camera employed in the system of the invention.

FIG. 8 shows the concept of a camera which can record the upper/lower information as mentioned above. An information output& circuit 81 detects the position of the camera upon photographing. To detect the position, it is possible to use well-known means such that, for instance, mercury is sealed into a glass tube and the position at which the mercury is moved by gravity is detected by the short-circuit of a pair of electric contacts caused by the mercury. The position information from the information output circuit 81 is converted into the upper/lower information by a CPU 82 every photographed frame and is directly recorded onto the film through an information recording circuit 84 as (shown in FIG. 7) or is recorded onto a storage medium arranged in the film container. An exposure control circuit 83 controls the exposure of object light onto the film synchronously with the operation of the information recording circuit 84.

In the case of sequentially printing the picture planes of a few frames onto one photographic paper in an album form, as shown in step 407 in FIG. 4, it is necessary to execute the process to print onto the next photographic paper after the printing operation of one photographic paper is finished (such a process is hereinafter referred to as a page feed process). The flow diagram of FIG. 9 shows the page feed process executed on the basis of date information recorded upon photographing.

Such a process can be initiated by providing a photographing date and time detecting function for the information output circuit 81 (FIG. 8) of the camera. The information from the information output circuit 81 is converted into the date information by the CPU 82. The date information is directly recorded onto the film through the information recording circuit 84 as (shown in FIG. 7) or recorded onto a storage medium enclosed in the film container.

Figure 9:
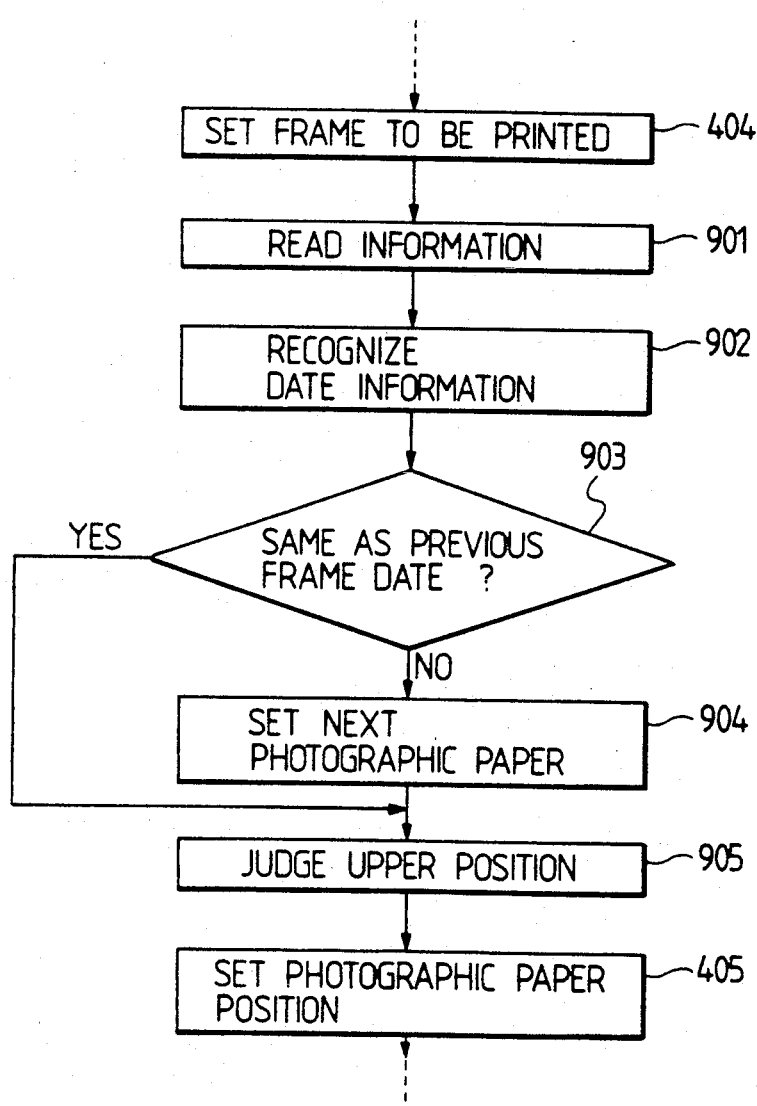
FIG. 9 is a flow chart illustrating a page feed process in accordance with the invention.

In FIG. 9, the processes in steps 901 to 905 are inserted between steps 404 and 405 in FIG. 4.

After the processes in steps 401 to 404 in FIG. 4 are executed, in step 901 in FIG. 9, the upper/lower information corresponding to the frame on the negative film 31 to be printed next and the date information (including the information of year, month, day, hour, minute, and second) indicative of the photographing date and time of the frame are read out of the storage medium by the information reading circuit 51.

In the next step 902, the read date information is recognized. In step 903, a check is made to see if the read date information is the same as the information of "year, month, day" of the previous printed frame or not. If "year, month, day" have been changed, step 904 follows and the next photographic paper is set in a manner similar to step 403. Then, the processing routine advances to step 905. If "year, month, day" are the same, step 905 is skipped.

The process in step 905 is similar to step 602 in FIG. 6. In step 905, the rotating angle at which the photographic paper 35 is rotated in the next step 405 is obtained on the basis of the upper/lower information which was read in step 901.

The processes after step 405 are then successively executed.

It will be understood that by the series of processes in steps 901 to 904, when "year, month, day" of the frame to be printed are changed, the print page on the album is changed to the new page.

In the printing process in step 406 if the numerical values of "year, month, day" are printed into the blank portion of the photographic paper in a form such that they can be observed, it will be understood that all of the photographs arranged on the print page were photographed on the same day. Therefore, such a printing method is convenient.

In the embodiment, described the page feed process has been performed on the basis of the "year, month, day" information. However, the invention is not limited to such a method. For instance, when the photographing frequency is low, the page feed process is executed on the basis of the "year, month" information and the page is changed to the new page after the photographing month was changes. On the contrary, if the photographing frequency is high, the page may also be changed to the new page every photographing hour on the basis of the "year, month, day, hour" information.

It is desirable that the function of generating information designating the paper feed process to be executed on the basis of the date information be provided for the information output circuit 81 in FIG. 8.

Forced page feed information for allowing the printer to execute the paper feed process at an arbitrary frame may also be provided for the information output circuit 81, thereby enabling the page feed process to the forcedly executed at an arbitrary frame irrespective of the date information. For instance, each time the photographing location changes, the information output circuit 81 may output forced page feed information. The forced page feed information may be directly stored on the film through the information recording circuit 84 of stored on another storage medium. It is sufficient that upon printing, when the frame on which the forced page feed information was recorded arrives, the next photographic paper is advanced. Thus album-like prints whose pages are changed for every photographing location are obtained. When the printer operates in a manner such that both of the date information and the forced page feed information are recognized in step 902 in FIG. 9, a check is made to see if the forced page feed information exists in addition to the discrimination with respect to whether "year, month, day" have been changed in step 903 in FIG. 9. In this case, if the photographing day has changed or the forced page feed information has been recorded, the photographic paper is changed.

FIGS. 10 to 12 show another embodiment of a printing system that may be employed in the invention. This embodiment is characterized in that a photograph of a different enlarged size can be printed in one album-like print. For instance, as shown in FIG. 11, a photograph 121 whose enlarged size is larger than the regular size is printed together with photographs 122 and 123 of the regular size.

Such a process can be initiated by providing enlarged frame size information for the information output circuit 81 in FIG. 8, and the size information is directly recorded onto the film through the information recording circuit 84 or is recorded onto another storage medium.

When a photograph of a large size as shown in FIG. 11 is printed, as compared with the case where only photographs of the regular size are arranged and printed, the number of frames which can be printed to one photographic paper decreases. Therefore, it is necessary to execute the process accordingly.

In the flow diagram of FIG. 10, steps 1001 and 1002 are inserted between steps 905 and 405 in FIG. 9. the flow chart of FIG. 12 shows the processing content in step 1002 in detail.

In FIG. 10, after the processes through step 905 in FIG. 9 are finished, step 1001 is executed and a check is made to see if the enlarged size information stored in conjunction with any frame on the negative film exists or not. In the case of the ordinary enlarged size, no size information is recorded, so that the processing routine skips to step 405. If the size information to designate a size other than the ordinary enlarged size exists, step 1002 follows and the enlarged size setting process shown in FIG. 12 is executed.

In FIG. 12, the content of the enlarged size information is recognized in step 1201. An electric zooming function of the projecting optical system 36 shown in FIG. 3 is made operative, thereby setting the projecting optical system 36 to the enlarged magnification according to the size information.

In the next step 1202, a check is made to see if the size of the blank portion of the photographic paper is a size at which the enlarged size of the frame to be printed next can be arranged or not. If it is a size at which the enlarged size cannot be arranged, step 1204 follows and the page feed process to change the photographic paper 35 is executed. If it is a size at which the enlarged size can be arranged, the processing routine is returned and the processes after step 405 are executed in order to print to the blank portion.

Although the above embodiment has been described with respect to the case where the date information can be recorded in a the blank portion in a form such that it can be observed, the invention is not limited to such a construction. Information other than the date, for instance, character information indicative of the photographing location may also be used as the information to be recorded. In the case of a large amount of information, the character information is handled in a manner similar to the photographed frame and the character information may also be recorded in the area in which the photograph of the frame will be printed. In such a case, the process responsive to the size information shown in FIGS. 10 and 12 is also similarly executed for the character information. That is, in the case where the area which is occupied by the character information is larger than the blank portion of the photographic paper, the page feed process is executed.

As a method of processing various kinds of information with respect to each frame as mentioned above, the information is read for every print of each frame and the process is executed as mentioned above. However, the invention is not limited to such a method. At the stage before the printing process of the first frame is started, all the information regarding all frames may be read. According to this method, since it is possible to know the kind of printing process before the printing process is started, the cost which will be required to print can be preliminarily conveyed to a person who requests the print.

In the foregoing embodiment, the constructions disclosed in U.S. Pat. No. 4,607,949 can be used as the constructions of the printer and image rotator.

Although the invention has been described with respect to a system in which image information is recorded onto a photosensitive film, the invention is not limited to such a system. The invention can also be applied to what is called an electronic camera system in which image information is recorded as an electric signal. In this case, a magnetic disk or a semiconductor memory (RAM, $E^2PROM$, or the like) is used as a recording medium and the printer functions as an apparatus which reproduces and visualizes the image information of the electric signal on a sheet such as a paper or the like. In addition to a sheet such as photographic paper, paper, or the like, a VDT (visual display terminal) or a television having a display screen such as a CRT (cathode ray tube) or the like can be used as a medium for reproducing and visualizing image information. The image information of a plurality of frames may be visualized on the display screen in a form similar to the foregoing print.

Figure 13:
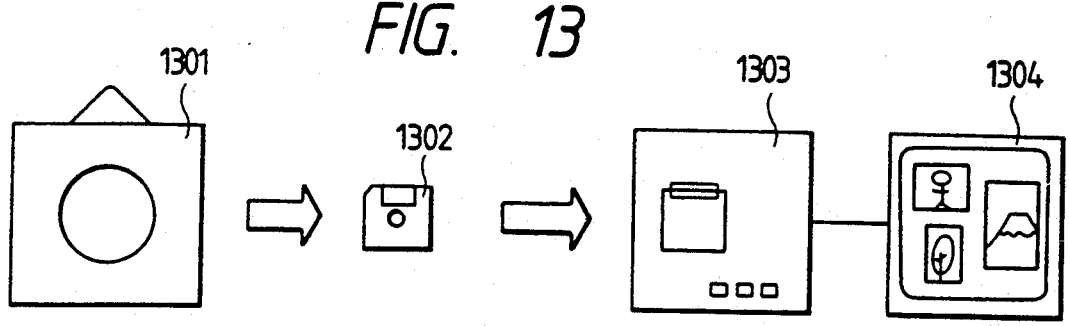
FIG. 13 is a schematic illustration of another embodiment of an image processing system in accordance with the invention.
Figure 14:
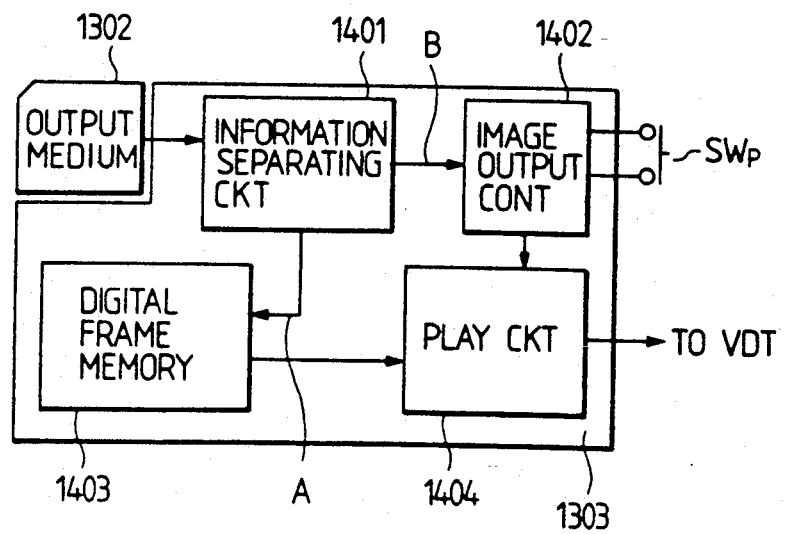
FIG. 14 is a block diagram showing a portion of the system of FIG. 13 in greater detail.

An embodiment of a system in which image information of a plurality of frames is visualized by a VDT or the like will now be described hereinafter with reference to FIGS. 13 and 14. FIG. 13 is a diagram for systematically explaining the processes from the recording to the reproduction in the system. FIG. 14 is a diagram showing a construction of a player or a reproducer in FIG. 13.

In FIG. 13, a still video camera 1301 records photographed information onto an output medium 1302. After the photographing, the output medium 1302 is taken out of the still video camera 1301 and is electrically connected to a player 1303. The player 1303 reads out the information from the output medium 1302 and displays it on a VDT 1304. The fundamental construction of the foregoing system has been disclosed in U.S. Pat. No. 4,420,773. In the embodiment, the output medium 1302 is constructed by $E^2PROM$, RAM, or the like and includes both of the image information and the control information. The control information includes the upper/lower information, date information, and the like.

As shown in FIG. 14, the player 1303 comprises an information separating circuit 1401; an image output control circuit 1402; a digital frame memory 1403; a play circuit 1404; and a page feed switch $SW_p$. When the output medium 1302 is connected to the player 1303, the information on the output medium 1302 is read out by the information separating circuit 1401. In the information separating circuit 1401, the information is separated into image information A and control information B. The image information is transferred to the digital frame memory 1403. The control information B is transferred to the image output control circuit 1402. The digital frame memory 1403 has a large memory capacity and can store the image of a plurality of frames (for instance, all of the frames in the output medium) and can transmit the image signal to the play circuit 1404. The image output control circuit 1402 transfers the upper/lower information and other information to the play circuit 1404. The page feed switch $SW_p$ is connected to the image output control circuit 1402. By turning on the switch $SW_p$, a page feed signal is supplied to the play circuit 1404 through the image output control circuit 1402, so that the page feed process can be executed. The play circuit 1404 is connected to the VDT 1304 (FIG. 13) and outputs the image signal to the VDT 1304 on the basis of the information from the digital frame memory 1403 and image output control circuit 1402.

We claim:

1. An image processing system comprising:
a camera having image information recording means for recording image information of a plurality of picture planes and having control information recording means for generating control information in correspondence to each of said picture planes and for recording said control information; and
a reproducing apparatus having reproducing means for reproducing said image information of said plurality of picture planes on a signal image reproducing medium and having control means for reading said control information and for controlling said reproducing to form an array of said plurality of picture planes on said image reproducing medium on the basis of the control information.

2. A system according to claim 1, wherein said control information which is recorded by said control information recording means includes upper/lower information indicative of an upper/lower direction of each of said picture planes, and said control means controls said reproducing means on the basis of said upper/lower information such that the upper and lower positions of each of the picture planes are aligned on said image reproducing medium.

3. A system according to claim 1, wherein said control information which is recorded by said control information recording means includes identification information indicative of a group of said image information to be reproduced together on said image reproducing medium, and said control means controls said reproducing means on the basis of said identification information and reproduces said group together on said image reproducing medium.

4. A system according to claim 3, wherein said identification information includes date information indicative of a date of recording of said image information, and said control means controls said reproducing means to reproduce together image information with the same date information.

5. A system according to claim 1, wherein said control information which is recorded by said control information recording means includes size information indicating at which size each of said picture planes should be reproduced onto said image reproducing medium, and said control means controls said reproducing means on the basis of said size information and reproduces each of the picture planes onto the image reproducing medium at the size based on said size information.

6. A system according to claim 5, wherein said reproducing apparatus determines whether there is room on said reproducing medium for the reproduction of a picture plane at a size indicated therefor by corresponding size information, and, if there is insufficient room on said reproducing medium, said reproducing apparatus changes the image reproducing medium.

7. A system according to claim 1, wherein said image reproducing medium includes a sheet.

8. A system according to claim 7, wherein said sheet includes a photographic paper.

9. A system according to claim 1, wherein said image reproducing medium includes a visual display terminal.

10. A system according to claim 1, wherein said image information recording means records said image information on a photosensitive film.

11. A system according to claim 10, wherein said control information recording means records said control information on said photosensitive film, sad image information and said control information being recorded on different areas of said photosensitive film.

12. A system according to claim 10, wherein said control information recording means records said control information on a medium different from said photosensitive film.

13. A system according to claim 12, wherein the last-mentioned medium comprises a semiconductor memory.

14. A camera used in an image processing system including a reproducing apparatus for reproducing image information of a plurality of picture planes on a single image reproducing medium characterized by having image information recording means for recording said image information and having control information recording means for generating control information in correspondence to each of said picture planes and for recording said control information, said reproducing apparatus having reproducing means for reproducing said image information of sad plurality of picture planes on said single image reproducing medium and having control means for reading said control information and for controlling said reproducing to form an array of said plurality of picture planes on said image reproducing medium on the basis of the control information.

15. A reproducing apparatus used in an image processing system including a camera for recording image information of a plurality of picture planes, characterized by having reproducing means for reproducing said image information of said plurality of picture planes on a single image reproducing medium, sad camera having image information recording means for recording said image information of said plurality of picture planes and having control information recording means for generating control information in correspondence to each of said picture planes and for recording said control information, and by having control means for reading said control information and for controlling said reproducing to form an array of said plurality of picture planes on said image reproducing medium on the bias of the control information.

16. A camera having image information recording means for recording image information of a plurality of picture planes and having upper/lower information recording means for generating upper/lower information in correspondence to each of said picture planes and for recording said upper/lower information, said upper/lower information being indicative of an upper/lower direction of each of said picture planes.

17. A camera according to claim 16, wherein said image information recording means records said image information on a photosensitive film.

18. A camera according to claim 17, wherein said upper/lower information recording means records said upper/lower information on said photosensitive film, said image information and said upper/lower information being recorded on different areas of said photosensitive film.

19. An image processing method comprising:

recording image information of a plurality of picture planes;

generating control information in correspondence to each of said picture planes;

recording said control information;

reproducing the recorded image information of said plurality of picture planes on a signal image reproducing medium;

reading the recorded control information;

and controlling said reproducing to form an array of said plurality of picture planes on said single image reproducing medium on the basis of the read control information.

20. A method according to claim 19, wherein said image information is recorded on a photosensitive film.

21. A method according to claim 20, wherein said control information is recorded on said photosensitive film, sad image information and said control information being recorded on different areas of said photosensitive film.

22. A method according to claim 20, wherein said control information is recorded on a medium different from said photosensitive film.

23. A method according to claim 22, wherein said control information is recorded on a semiconductor memory.

24. A method according to claim 19, wherein said control information includes upper/lower information indicative of an upper/lower direction of each of said picture planes, and said reproducing is controlled on the basis of said upper/lower information such that the upper and lower positions of each of the picture planes are aligned on said image reproducing medium.

25. A method according to claim 19, wherein said control information includes identification information indicative of a group of said image information to be reproduced together on said image reproducing medium, and said reproducing is controlled on the basis of said identification information and reproduces said group together on said image reproducing medium.

26. A method according to claim 25, wherein said identification information includes data information indicative of a date of recording of said image information, and said reproducing is controlled to reproduce together image information with the same data information.

27. A method according to claim 19, wherein said control information includes size information indicating at which size each of said picture planes should be reproduced on said image reproducing medium, and said reproducing is controlled on the basis of said size information and reproduces each of the picture planes on the image reproducing medium at a size based on said size information.

28. A method according to claim 27, wherein said reproducing determines whether there is room on said reproducing medium for the reproduction of a picture plane at a size indicated therefor by corresponding size information, and, if there is insufficient room on said reproducing medium, changes the image reproducing medium.

29. A method according to claim 19, wherein said image reproducing medium includes a sheet.

30. A method according to claim 29, wherein said sheet includes a photographic paper.

31. A method according to claim 19, wherein said image reproducing medium includes a visual display terminal.

32. A recording apparatus used in an image processing system including a reproducing apparatus for reproducing image information of a plurality of picture planes on a signal image reproducing medium, characterized by having control information recording means for generating control information in correspondence to each of said picture planes and for recording said control information, said reproducing apparatus having reproducing means for reproducing said image information of said plurality of picture planes on said single image reproducing medium and having control means for reading said control information and for controlling said reproducing to form an array of said plurality of picture planes on said image reproducing medium on the basis of the control information.

33. A reproducing apparatus used in an image processing system including image information recording means for recording image information of a plurality of picture planes and control information recording means for generating control information in correspondence to each of said picture planes and for recording said control information, characterized by having reproducing means for reproducing said image information of said plurality of picture planes on a single image reproducing medium, and by having control means for reading said control information and for controlling said reproducing to form an array of said plurality of picture planes on said image reproducing medium on the basis of the control information.

34. A recording apparatus used for a photosensitive film on which image information of a plurality of picture planes is recorded having upper/lower information recording means for generating upper/lower information in correspondence to each of said picture planes and for recording sad upper/lower information, said upper/lower information being indicative of an upper/lower direction of each of said picture planes.

35. A camera comprising:

image information recording means for recording image information of a plurality of picture planes;

and discrimination information recording means for recording discrimination information to discriminate each picture plane, in the form of an automatically detectable signal.

36. A camera according to claim 35, wherein said discrimination information recording means automatically records the discrimination information in response to an operation of said image information recording means.

37. A camera according to claim 36, wherein said discrimination information recording means records information relating to a date when said image information recording means operates, as the discrimination information.

38. A camera according to claim 35, wherein said discrimination information recording means records the discrimination information in response to a manual operation.

39. An image reproducing apparatus used in an image processing system including a camera for recording image information of a plurality of picture planes and discrimination information for discriminating said picture planes, into recording medium means, characterized in that said image reproducing means comprises reading means for automatically detecting said discrimination information recorded into said recording medium means, and reproducing means for reproducing the image information recorded into said recording medium means, in accordance with the discrimination information.

* * * * *